Patented Apr. 29, 1924.

1,492,110

UNITED STATES PATENT OFFICE.

HAROLD T. STOWELL, OF BUFFALO, NEW YORK, ASSIGNOR TO NATIONAL ANILINE & CHEMICAL COMPANY, INC., OF NEW YORK, N. Y., A CORPORATION OF NEW YORK.

ANTHRACENE DYE AND PROCESS OF MAKING SAME.

No Drawing.    Application filed March 8, 1923.   Serial No. 623,729.

*To all whom it may concern:*

Be it known that I, HAROLD T. STOWELL, a citizen of the United States, residing at Buffalo, in the county of Erie, State of New York, have invented certain new and useful Improvements in Anthracene Dyes and Processes of Making Same; and I do hereby declare the following to be a full, clear, and exact description of the invention, such as will enable others skilled in the art to which it appertains to make and use the same.

The present invention relates to new coloring-matters which are suitable for dyeing textile fibres, especially cotton, yellowish brown shades. The dyed fibres or fabrics, or other material, dyed with the new coloring-matters also form a part of the present invention.

The new coloring-matters are obtainable by subjecting flavanthrone (also called flavanthrene), and commercially known as indanthrene yellow G, to the action of sulfuric acid in the presence of boric acid. The new coloring-matters are insoluble in water, dilute acids and dilute alkalies. They dissolve, however, in alkaline hydrosulfite solutions, and in this form exhibit the typical properties of a vat, dyeing textile fibre, especially cotton, bluish shades which upon atmospheric oxidation change to brown shades of excellent fastness to light.

The following example will serve to illustrate the invention, the parts being by weight:

*Example.*—To 90–95 parts of 25 per cent oleum (that is, fuming sulfuric acid containing 25 per cent free sulfuric anhydride) there are added 2.5 parts of dry, crystallized boric acid and 5 parts of flavanthrone, and the mixture is heated to a temperature of 125° C. for about 1.5 hours. The sulfuric acid solution turns from a purple to a blue color. The mixture is then poured onto ice and water and the precipitate collected, thoroughly washed with water, and dried.

The new coloring-matter thus obtained, and in the dry state, is a dark brown powder insoluble in water, diulte acid, dilute alkali, nitrobenzene, and acetic acid. It dissolves in cold concentrated sulfuric acid (93 per cent) with a deep red color which upon dilution with ice and water produces an orange colored flocculent precipitate, which remains insoluble but changes to a green color upon addition of an excess of caustic soda solution. The new coloring-matter dissolves in fuming sulfuric acid (containing 25 per cent of sulfuric anhydride) to give a blue solution. The new coloring-matters can be directly employed for dyeing after having formed a vat therefrom by suitable reduction. It dissolves, for example, in alkaline sodium hydrosulfite solutions with a blue color and the solution thus obtained directly dyes cotton bluish shades which upon subsequent exposure to the air give yellowish brown shades fast to light but somewhat sensitive to alkali, the color being restored, however, by an acid treatment.

I claim:

1. The process of making new coloring-matter which comprises subjecting flavanthrone to the action of sulfuric acid in the presence of boric acid.

2. The process of making new coloring-matter which comprises subjecting flavanthrone to the action of sulfuric acid in the presence of boric acid and precipitating the dye from the resulting solution.

3. The process of making new coloring-matter which comprises subjecting flavanthrone to the action of fuming sulfuric acid in the presence of boric acid at a temperature of about 125° C.

4. The process of making new coloring-matter which comprises subjecting flavanthrone to the action of fuming sulfuric acid in the presence of boric acid at a temperature of about 125° C. and precipitating the dye from the resulting solution.

5. As a new product, the coloring-matter obtainable by treating flavanthrone with fuming sulfuric acid in the presence of boric acid at a temperature of about 125° C., which coloring-matter is practically insoluble in water but dissolves in ordinary concentrated sulfuric acid giving a red solution and in fuming sulfuric acid containing 25 per cent of free sulfuric anhydride giving a blue solution; and which dissolves in an alkaline sodium hydrosulfite solution giving a blue solution which solution acts as a vat and dyes textile fibre, especially cotton, bluish shades which upon suitable exposure to air give yellowish brown shades fast to light.

6. Materials dyed with the new coloring-matter of claim 5.

In testimony whereof I affix my signature.

HAROLD T. STOWELL.